United States Patent Office 3,849,533
Patented Nov. 19, 1974

3,849,533
SORPTION AGENT FOR NONSOLID METALS
Wolfgang Hetz, Kehl, Germany, assignor to Roth Handels GmbH, Basel, Switzerland
No Drawing. Filed June 5, 1972, Ser. No. 259,480
Claims priority, application Switzerland, June 10, 1971, 8,588/71
Int. Cl. C01g 13/00
U.S. Cl. 423—99
10 Claims

ABSTRACT OF THE DISCLOSURE

Liquid mercury is collected on a solid carrier impregnated with a water-soluble silver salt and containing sufficient moisture for speedy reaction of the silver salt with the mercury, whereby mercury salts and metallic silver are formed, and the elementary silver binds additional mercury in the form of an amalgam.

The present invention relates to a new agent for collecting liquid metals, such as mercury, gallium, Rose's metal, Wood's metal, and metal vapors, as well as to a process for recovering the collected metals.

The agent of the invention is especially useful for collecting spilled mercury. The following description relates in particular to the collecting of liquid mercury, but the invention is not restricted thereto.

Mercury, which is the only metal that is liquid at room temperature, is widely used because of its special properties, but spilled mercury often becomes the source of chronic mercury poisoning because it is finely divided and produces a relatively large amount of mercury vapor. Collecting spilled mercury is difficult due to its extremely high surface tension and very high density. It is, for example, virtually impossible to remove mercury spilled in a floor joint without taking up the whole flooring.

Up to now, granulated active charcoal containing iodine has been considered to be the best means of removing mercury. However, the absorption rate and capacity of iodine bearing carbon for mercury is relatively low.

The object of the present invention is the provision of a new composition of matter capable of taking up relatively large amounts of liquid metal (and metal vapors) at high rates.

The new composition of the invention consists of a solid carrier whose surface is impregnated with a compound of a metal more noble than the metal to be taken up.

The expression "more noble" means that the metal whose compound (preferably a salt) is provided on the carrier substance stands nearer in the electromotive series of metals to the most noble metals than the metal to be taken up.

The metal to be taken up displaces the more noble metal present on the carrier from its compounds. The last-mentioned metal precipitates in a finely divided form.

Metals which are more noble than mercury are, for example, silver, gold, palladium, platinum. Therefore, the carrier is impregnated with a salt of silver, gold, palladium or platinum.

The solid carrier is preferably impregnated with silver nitrate. Silver is preferred for its relatively low cost. Other soluble stable silver salts may be used instead of silver nitrate, such as the acetate, formate, chloroacetate, sulfate, fluoride as well as complex salts, such as the amino, cyano, cyanato, thiocyanato and thiosulfate complex salts. The nitrate, acetate, and fluoride are of particular utility.

It has further been found that the results are best if the collecting agent according to the invention contains moisture, preferably from 5 to 10 weight percent, at most, however, such an amount of water that the collecting agent is still free flowing and seems to be dry on the outside.

The carrier may be fine-grained or coarse-grained. It may be porous or non porous. For instance, active charcoal, infusorial earth (diatomite, kieselguhr), silica gel, glass, ceramic materials, such as porcelain and earthenware particles, bentonites, asbestos, vermiculite, sand, alumina, cellulose fibres, plastics, may serve as carriers. The preferred carrier is silica gel having a grain size of 0.2 to 0.5 mm.

The preferred collecting agent contains 11 weight percent of water as well as 24 weight percent of silver nitrate. The concentration of noble metal salts in the new agent may, however, vary within relatively wide limits, from 5 to 50 weight percent. A content between 15 and 30 weight percent is, however, preferred.

The carrier may also be a powder. This is of advantage when it is necessary to take up mercury from narrow joints in which it has been spilled. The pulverulent, mercury-bearing collecting agent may easily be picked up with the aid of a vacuum cleaner.

The mercury compound formed (mercury (I) nitrate) may be converted to compounds which are no longer toxic and insoluble, such as the sulfide. For example, potassium sulfide or another alkali metal sulfide applied on silica gel may be added to the collecting agent, or an agent may be used which, in addition to silver nitrate, contains silver or alkali metal sulfide. Such a collecting agent may be used for collecting mercury that has penetrated into deep joints, cable chutes or the like. The agent, preferably in the form of a powder, is placed in the joint where it takes up the mercury and may then remain there because it converts the mercury into its non-toxic form.

The agent may consist of a mixture of granular silica gel containing silver nitrate.

It has been found that the capacity of the collecting agent is far higher than may be expected according to the stoichiometric equation:

$$2AgNO_3 + 2Hg \rightarrow Hg_2(NO_3)_2 + 2Ag$$

Accordingly, it is assumed that amalgam formation contributes considerably to the high sorption rate, since the silver formed is very finely distributed and is surrounded by metallic mercury upon its formation.

The following examples further illustrate the present invention.

EXAMPLE 1

A saturated silver nitrate solution is prepared at 21° C. from 100 g. water and 220 g. AgNO₃. This solution is poured into a flask and dry silica gel having a grain size of 0.2 to 0.5 mm. is added in small amounts until the mixture consists of individual grains which feel dry and which are capable of flowing. About 600 g. of silica gel is required for this.

The thus obtained agent is ready for use. In the absence of light its storage stability is unlimited.

EXAMPLE 2

20 g. of each of the collecting agents mentioned below was added to 20 g. of liquid mercury at 20° C. in an Erlenmeyer flask. The flask was shaken from time to time. The following observations were made:

| Agent: | Observations |
|---|---|
| (a) Produced according to the invention in accordance with example 1. | The Hg disappears after 2 to 3 minutes. 25 g. of Hg are taken-up in 4 minutes (theoretical capacity according to the equation: 5.75 g. Hg). |
| (b) Produced according to the invention in accordance with Example 1, mixed with equal parts of potassium sulfide and silica gel. | The Hg disappears after about 10 minutes. |
| (c) Silica gel-potassium sulfide. | The Hg disappears after about 4 days. |
| (d) Iodine carbon, such as commercially available. | No considerable decrease of the liquid Hg was noticeable after 4 weeks. |
| (e) Flowers of sulfur | The Hg drops were covered after some hours; the Hg had not yet disappeared after 4 weeks. |
| (f) Zinc powder | The Hg-surface is covered; the Hg had not yet disappeared after 4 weeks. |
| (g) Tin powder | Behavior like zinc powder. |

Further tests have shown that the new agent is likewise most successful in the removal of metal vapors, in particular lead vapors and mercury vapors.

Active charcoal used as a carrier material sometimes offers special advantages. Due to its increased adsorption capacity for water as compared with silica gel, active charcoal impregnated approximately according to Example 1 is more suitable for collecting spilled mercury in a wet environment.

The mercury and the noble metals may be recovered by known separation processes.

What is claimed is:

1. A method of collecting a liquid metal selected from the group consisting of mercury, gallium, Rose's metal, and Wood's metal which comprises contacting said liquid metal with a solid, absorbent carrier impregnated with a water-soluble salt of a metal more noble than said liquid metal until said liquid metal reacts with said salt of the more noble metal to form a salt of said liquid metal, and the formed salt is absorbed by said carrier.

2. The method as set forth in claim 1, wherein said carrier is a member of the group consisting of active carbon, infusorial earth, silica gel, glass, porcelain, earthenware, bentonite, asbestos, vermiculite, sand, alumina, and cellulose.

3. The method as set forth in claim 2, wherein said more noble metal is silver, gold, palladium, or platinum.

4. The method as set forth in claim 2, wherein said liquid metal is mercury, and said more noble metal is silver.

5. The method as set forth in claim 4, wherein said carrier is particulate and free flowing, and contains at least 5% water by weight.

6. The method as set forth in claim 5, wherein said carrier is silica gel having a grain size of 0.2 to 0.5 mm.

7. The method as set forth in claim 5, wherein said salt of said more noble metal is silver nitrate.

8. The method as set forth in claim 5, wherein said carrier additionally contains an alkali metal sulfide or silver sulfide.

9. A method of collecting a member of the group consisting of liquid mercury, liquid gallium, liquid Rose's metal, liquid Wood's metal, mercury vapor, and lead vapor which comprises contacting said member with a solid, absorbent carrier impregnated with a water-soluble salt of a metal more noble than said member until said member reacts with said salt of the noble metal to form a salt of said member, and the formed salt is absorbed by said carrier.

10. The method as set forth in claim 9, wherein said member is mercury vapor.

References Cited

UNITED STATES PATENTS

| 3,476,552 | 11/1969 | Parks et al. | 75—121 |
| 1,192,945 | 8/1916 | Sherwood | 75—118 |
| 3,695,838 | 10/1972 | Knepper et al. | 75—121 |
| 180,756 | 8/1876 | Dibben | 75—118 |

FOREIGN PATENTS

| 16,898 | 4/1914 | Great Britain | 75—118 |

OTHER REFERENCES

Smith: Inorganic Chemistry, 3rd edition (1921), pp. 403–404.

OSCAR R. VERTIZ, Primary Examiner

H. S. MILLER, Assistant Examiner

U.S. Cl. X.R.

75—118, 121; 252—184